United States Patent [19]
McCoy et al.

[11] Patent Number: 6,010,142
[45] Date of Patent: Jan. 4, 2000

[54] CAST DUCTILE IRON HITCH BAR

[75] Inventors: Richard McCoy, Granger; Thomas W. Lindenman, South Bend, both of Ind.

[73] Assignee: Reese Products, Inc., Elkhart, Ind.

[21] Appl. No.: 08/292,548

[22] Filed: Aug. 18, 1994

[51] Int. Cl.$^7$ .................................................. B60D 1/46
[52] U.S. Cl. ..................... 280/490.1; 280/491.5; 280/511
[58] Field of Search ............... 280/456.1, 461.1, 280/490.1, 504, 511, 491.5

[56] References Cited

U.S. PATENT DOCUMENTS

| | | | |
|---|---|---|---|
| 3,607,458 | 9/1971 | Hunsaker | 148/16 |
| 3,738,684 | 6/1973 | Lusk | 280/491.2 |
| 4,033,601 | 7/1977 | Lindahl et al. | 280/490.1 |
| 4,067,756 | 1/1978 | Koo et al. | 148/144 |
| 4,078,823 | 3/1978 | McBride | 280/490.1 |
| 4,148,498 | 4/1979 | Taylor, Jr. | 280/482 |
| 4,697,819 | 10/1987 | Cascone | 280/504 X |
| 4,737,199 | 4/1988 | Kovacs | 148/3 |
| 4,989,892 | 2/1991 | Kerins et al. | 280/511 X |
| 5,265,899 | 11/1993 | Harrison | 280/416.1 |

FOREIGN PATENT DOCUMENTS 594646  3/1960  Canada ............................. 280/490.1

OTHER PUBLICATIONS

SAE Handbook 1981, Society of Automotive Engineers, Inc., pp. 7.07–7.08.

*Primary Examiner*—Ann Marie Boehler
*Attorney, Agent, or Firm*—King and Schickli

[57] ABSTRACT

A hitch bar includes an integral post and mounting rack cast from ductile iron. A midline channel in the mounting rack and face cavities in the post significantly reduce the overall mass of the hitch bar. The physical properties of the cast ductile iron material serve to increase the overall towing capacity above that possible with rolled steel hitch bars of prior art design.

11 Claims, 1 Drawing Sheet

CAST DUCTILE IRON HITCH BAR

TECHNICAL FIELD

The present invention relates generally to the trailer towing field and, more particularly, to a new and improved hitch bar including an integrally cast post and mounting rack of ductile iron for utilization in a trailer hitch assembly.

BACKGROUND OF THE INVENTION

It has long been known in the art to provide a trailer hitch assembly for towing a trailer behind a vehicle incorporating (a) a hitch bar receiver connected by a frame to the vehicle, (b) a hitch bar including a mounting rack or support and a post adapted for engagement in the receiver and (c) a ball mount head adapted for engagement on the mounting rack. This basic type of trailer hitch assembly is shown in, for example, U.S. Pat. No. 3,482,856 to Reese; U.S. Pat. No. 3,768,837 to Reese; U.S. Pat. No. 4,033,601 to Lindahl et al. and U.S. Pat. No. 5,375,867 to Kass et al. also own by the assignee of the present invention.

In the over thirty years since this basic type of trailer hitch assembly was developed, numerous design modifications have been made with a goal of improving the overall product. For example, competitive pressures in the marketplace have led the various manufacturers of trailer hitch assemblies to make a serious effort to control and reduce manufacturing costs while at the same time increasing the overall towing capacity of the assemblies to benefit the end user. While significant improvements have been made, these competitive pressures are still present and still further improvements relating to the control of costs and the enhancement of performance characteristics are desired.

SUMMARY OF THE INVENTION

Accordingly, it is a primary object of the present invention to provide a trailer hitch assembly of relatively simple construction that may be produced at a lower overall cost by means of casting a hitch bar for such an assembly from a strong material such as steel, graphite composite and relatively inexpensive ductile iron.

Another object of the present invention is to provide a hitch bar of improved design that is not only relatively inexpensive to produce but also of significantly reduced weight when compared to conventional rolled steel and forged hitch bars of similar towing capacity. Advantageously, the reduction in weight allows an individual to more conveniently manipulate the hitch bar so that it is easier to engage in and withdraw from the hitch receiver mounted to the intended towing vehicle.

Still another object of the present invention is to provide a hitch bar of inexpensive construction and reduced overall weight that also provides the seemingly conflicting benefit of significantly increased towing capacity so as to allow the efficient and effective towing of larger, heavier trailers than possible with hitch bars of similar size and/or weight constructed in accordance with conventional manufacturing approaches.

Yet another object of this invention is to provide a new and simple method of manufacturing an integral, one-piece hitch bar from cast material.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved hitch bar is provided for utilization in a trailer hitch assembly of the type just described in the background section of this document. The hitch bar is an integral post and mounting rack cast from a material selected from a group including steel, graphite composite and ductile iron. Such a one-piece, integrally cast hitch bar provides a strong, unitized construction from material exhibiting the necessary strength and other desirable physical characteristics as are required to result in significant increases in towing capacity over prior art hitch bars of similar size and shape fabricated from cold rolled and forged steel components.

In the most preferred embodiment ductile iron is utilized in the integral casting of the hitch bar. This ductile iron is characterized by rounded or spheroidal graphite in a ferritic, pearlitic or ferritic-pearlitic matrix. Most preferably the ductile iron has a composition consisting essentially of 3.2–4.1% carbon, 1.8–3.0% silicon, 0.1–1.0% manganese, 0.015–0.1% phosphorous, 0.005–0.035% sulfur, up to 2.0% copper and the balance iron and residuals including but not limited to magnesium and cerium. Depending upon the specific chemical composition selected, the casting may be utilized in the "as cast" condition for many applications. This is advantageous from the standpoint of lowering production costs. The cast ductile iron, as cast, is further characterized by a minimum tensile strength of 65,000 psi, a minimum yield strength of 45,000 psi and an elongation for two inch length of between 6–12%.

Where additional strength is required, the cast ductile iron hitch bar may be annealed or austempered to further improve the physical properties of the integrally cast hitch bar. For example, an austempered hitch bar cast from ductile iron may be further characterized by a 30 Rockwell C hardness and a minimum tensile strength of between 120,000–150,000 psi. In the most preferred embodiment, the cast ductile iron alloy utilized is SAE grades D4512 or D5506.

Advantageously, the present invention not only allows for a significant increase in towing capacity but the casting of the hitch bar from ductile iron significantly lowers production costs compared to the prior art approach of fabricating the hitch bar from a cold rolled steel post and forged mounting rack. Still further, the overall weight of the hitch bar may be significantly reduced when compared to a hitch bar of prior art design providing similar strength and hence towing capacity. This is not only achieved by the superior physical characteristics of the cast ductile iron used for the hitch bar but also by the manner in which it is cast. More specifically, the front face of the mounting rack of the hitch bar is formed so as to include a midline channel. This channel defines a pair of parallel projecting wings. The mounting rack further includes a series of aligned mounting apertures extending through the wings. These apertures are also in communication with and extend substantially perpendicular to the midline channel. Such a construction provides sufficient strength and integrity for towing a vehicle while also significantly reducing material requirements and the overall mass of the hitch bar.

Additional reductions in mass without any appreciable loss in strength may also be provided. More specifically, the post of the hitch bar includes upper, lower, left side, and right side faces. Face cavities are recessed within margins of the left side and right side faces so as to form a substantially I-beam structure in cross section. Of course, such recesses eliminate the weight of material that would otherwise be present thereby further reducing the overall mass of the hitch bar. It should be realized, however, that the structural strength and integrity of the hitch bar are not compromised due to the presence of the full width margins that result in the I-beam cross section. Further, the anchoring aperture that is provided in the post to receive a pin for securing the hitch bar in the hitch receiver is positioned in a reinforced section having a lateral dimension corresponding to the full dimensions of the margins rather than the recessed portions. Thus, added strength is provided.

In accordance with still another aspect of the present invention, there is provided a method of manufacturing a hitch bar of the type described for a trailer hitch assembly. Briefly describing the method, it comprises the casting of the hitch bar so as to include an integral post and mounting rack of steel, graphite composite or ductile iron and the machining of the cast hitch bar to remove drafted surfaces. The method further includes the cast forming of the midline channel and face recesses in the mounting rack and post respectively that reduce the overall mass of the hitch bar to allow it to be more easily carried and manipulated by an operator when preparing a vehicle for towing. Preferably ductile iron is utilized in the casting. The method may then further include a step of austempering the cast ductile iron hitch bar so as to provide additional desired physical properties including a 30 Rockwell C hardness and a minimum tensile strength of between 120,000–150,000 psi.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serves to explain the principles of the invention. In the drawings.

Figure 1:
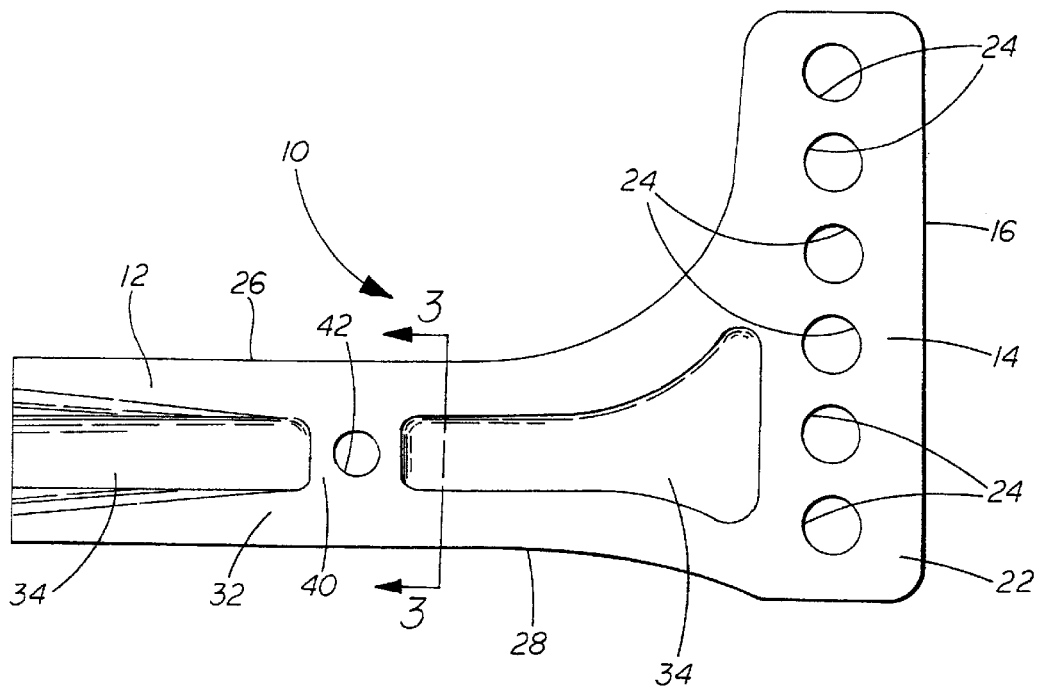
FIG. 1 is a right side elevational view showing the cast hitch bar of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the improved hitch bar 10 of the present invention of unitized, cast construction. Such a hitch bar 10 is adapted for utilization in a trailer hitch assembly of the type previously described wherein a bar or post portion is received and held by a pin in a hitch receiver mounted to a towing vehicle and a mounting rack or support portion receives a head assembly for holding a ball mount upon which the trailer may be attached.

More particularly, the hitch bar 10 includes an integral post 12 and mounting rack 14 cast, for example, from steel, graphite composite or ductile iron. Preferably ductile iron is utilized. The ductile iron is characterized by rounded or ball-like graphite in a matrix structure selected from a group consisting of a ferritic matrix, pearlitic matrix or a ferritic-pearlitic matrix mixture. Further, the ductile iron preferably has a composition consisting essentially of 2.0–4.5% and more preferably 3.2–4.1% carbon, 0.75–4.0% and more preferably 1.8–3.0% silicon, up to 2.0% and more preferably 0.1–1.0% manganese, up to 0.3% and more preferably 0.015–0.1% phosphorous, up to 0.3% and more preferably 0.005–0.035% sulfur, up to 2.0% copper and the balance iron and residuals including but not limited to magnesium and cerium. Such cast ductile iron is further characterized by having in the "as cast" condition a minimum tensile strength of 65,000 psi, a minimum yield strength of 45,000 psi and an elongation for two inch length of between 6–12%. Hence, for example, ductile iron of ASTM grades 65-45-12 and 80-55-06 and SAE grade D4512 or D5506 may be utilized for casting of the hitch bar 10 of the present invention.

Figure 2:
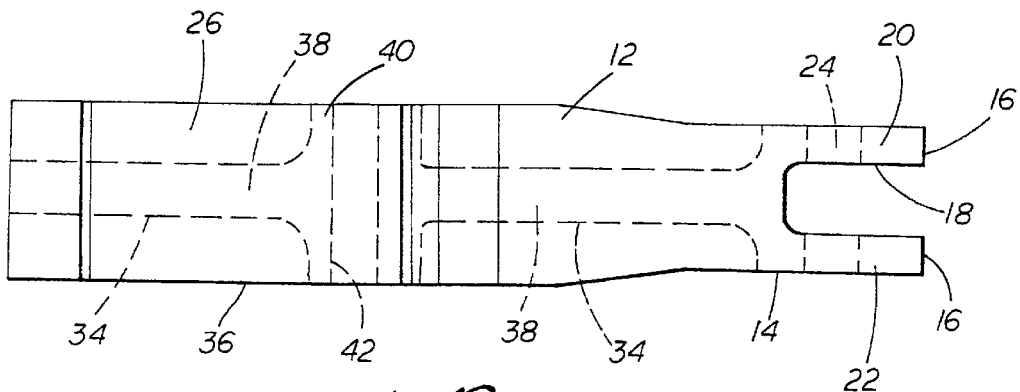
FIG. 2 is a top plan view of the hitch bar shown in FIG. 1.

As best shown in FIGS. 1 and 2, the mounting rack 14 of the hitch bar 10 includes a front face 16 directed away from the post 12. A midline channel 18 is provided along the entire length (i.e. height) of the front face 16 so as to define a pair of parallel projecting wings 20, 22.

As shown in FIG. 1, a series of aligned mounting apertures 24 are provided in the mounting rack 14. As is known in the art, there apertures 24 are provided for mounting a ball mount head (not shown) on the hitch bar 10. The mounting apertures 24 extend through the wings 20, 22. As shown, the mounting apertures 24 are in communication with the midline channel 18 and are aligned along an axis running substantially perpendicular to the longitudinal axis of that midline channel.

Figure 3:
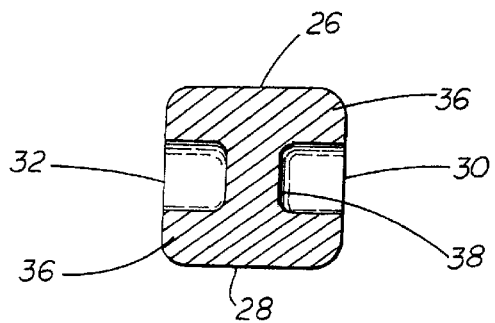
FIG. 3 is a sectional view of the hitch bar taken along line 3—3 as shown in FIG. 1.

The post 12 of the hitch bar 10 includes upper, lower, left side and right side faces 26, 28, 30, 32 respectively. A series of face cavities 34 are cast formed in the left and right side faces 30, 32. More specifically, as shown, the cavities 34 are recessed in an outer defining margin 36 thereby forming a substantially I-beam cross section shown best in FIG. 3.

Together, the provision of the midline channel 18 and face cavities 34 serves to substantially reduce the amount of ductile iron material required to cast the hitch bar 10. This, of course, reduces production costs. It should also be appreciated that the utilization of less material also reduces the overall mass of the hitch bar 10. In fact, a hitch bar of comparative size and strength produced in accordance with the present invention will weigh approximately 30% less than one fabricated from individual cold rolled and forged steel components in accordance with the generally accepted prior art approach. This significant weight reduction is a welcomed benefit to the tow vehicle operator when that operator is crouched down or bent over to engage the hitch bar post 12 in or withdraw it from the cooperating receiver attached to the vehicle. Thus, this is another beneficial aspect of the present invention.

Still more specifically describing the hitch bar 10, the channel 18 comprises approximately 50% of the total width of the front face 16 of the hitch bar 10. Each of the wings 20, 22 comprises approximately 25% of the total width. Accordingly, for a hitch bar with a total front face width of approximately two inches, the channel 18 is approximately one inch wide and each wing 20, 22 is approximately one half inch wide.

The face cavities 34 are each recessed approximately 35–38% of the total width of the margins 36 of the post 12. Accordingly, for example, for a post 12 that is two square inches in cross section, the face cavities 34 on the left and right side faces 30, 32 may each be recessed three quarters of an inch from the outer peripheral edge of the margins 36 leaving an one half inch wide midline section to form the central leg 38 of the I-beam.

Despite the presence of the weight saving midline channel 18 and face cavities 34, the hitch bar 10 of the present invention is particularly strong due to both the physical characteristics and properties of the cast ductile iron material and the design of the casting. For example, the casting includes a reinforced section 40 in the post 12 having a lateral dimension corresponding to the opposing peripheral edges of the margins 36. The anchoring aperture 42 for receipt of the pin (not shown) that connects the post 12 to the receiver of the trailer hitch assembly is formed in the section 40 so as to provide added strength to the hitch bar 10. All corners are also radiused to relieve stress concentrations and increase overall component integrity. In fact, an integrally cast, one-piece post and mounting rack hitch bar 10 of the present invention cast from ductile iron exhibits a towing capacity of approximately 20% greater than a comparable size and weight hitch bar of prior art design fabricated from cold rolled and forged steel components.

The optimal geometric design of the present cast hitch bar just described is the direct result of development work melding together the most beneficial characteristics of finite element analysis and the casting process. More specifically, finite element analysis allows one to study various geometric configurations or designs in a relatively short period of time without the necessity of prototype testing. The casting process allows one to readily add material where it is needed and remove material where it is not. Thus, through the cooperative application of these two approaches the smoothest transition in stress concentration levels is achieved along with the added benefits of significant weight savings without any compromises to overall strength.

Advantageously, the superior properties of the hitch bar 10 of the present invention may be provided in the as cast condition which is advantageous from a standpoint of lowering production costs. It should be appreciated, however, that the cast ductile iron hitch bar 10 may also undergo austempering to further improve its physical properties. In fact, the austempering may be completed so as to provide a hitch bar 10 with a 30 Rockwell C hardness and a minimum tensile strength of 120,000–150,000 psi. This further increases the towing capacity of the hitch bar well above that possible with a prior art hitch bar of comparable size and weight.

The method of production of the hitch bar 10 of the present invention is particularly efficient and effectively lowers production costs over comparable rolled steel hitch bars. Production involves the use of a sand cast process by means of a diastematic pattern in conjunction with two core boxes. Following casting, the hitch bar 10 is machined along the upper and lower faces 26, 28 to remove drafted surfaces. This machining may be accomplished, for example, by use of a C.N.C. mill. Generally, the mounting apertures 24 and anchoring aperture 42 are acceptable in an "as cast" condition. In certain situations, however, it may be desirable to ream or drill the holes to size.

Where additional strength is required for particular trailer towing applications, the cast hitch bar 10 may be subjected to an austempering process. More particularly, the cast ductile iron hitch bar 10 is heat treated to a temperature of between 400–800° F. for a desired time then rapidly quenched to a temperature several degrees above the martensite transformation temperature and held at that temperature for a brief time so that the hitch bar comes to a nearly uniformed temperature. The austenite structure formed due to the heat treating then transforms to bainite with superior strength properties resulting in even higher towing capacities being provided.

In summary, numerous benefits have been described which result from employing the concepts of the present invention. More particularly, the hitch bar 10 provided is more economical to produce than prior art hitch bars fabricated from a cold rolled steel post and a forged steel mounting rack. Further, the cast ductile hitch bar 10 of the present invention is lighter in weight. It also provides an overall increase in towing capacity when compared to hitch bars of prior art design.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A hitch bar for a trailer hitch assembly including a hitch receiver, comprising:

an integral post and mounting rack cast from ductile iron including means for mounting directly to said hitch receiver, wherein said post includes upper, lower, left side and right side faces and face cavities recessed within a margin of said left side and right side faces so as to form a substantially I-beam cross section.

2. The hitch bar set forth in claim 1, wherein said mounting rack includes a front face and a midline channel in said front face so as to define a pair of parallel projecting wings.

3. The hitch bar set forth in claim 2, wherein said mounting rack includes a series of aligned mounting apertures extending through said wings and in communication with and substantially perpendicular to said midline channel.

4. The hitch bar set forth in claim 1, wherein said post includes a reinforced section and an anchoring aperture in said reinforced section, said reinforced section having a width corresponding to said margin.

5. The hitch bar set forth in claim 1, wherein said post includes a reinforced section and an anchoring aperture in said reinforced section, said reinforced section having a width corresponding to said margin.

6. A hitch bar for a trailer hitch assembly including a hitch receiver, said hitch bar comprising:

an integral post and mounting rack including means for mounting directly to said hitch receiver cast from ductile iron having rounded graphite in a matrix structure selected from a group consisting of a ferritic matrix, pearlitic matrix and mixtures thereof and said ductile iron having a composition consisting essentially of 2.0–4.5% carbon, 0.75–4.0% silicon, up to 2.0% manganese, up to 0.3% phosphorous, up to 0.3% sulfur, up to 2.0% copper and the balance iron, wherein said post includes upper, lower, left side and right side faces and face cavities recessed within a margin of said left side and right side faces so as to form a substantially I-beam cross section and said mounting rack includes a front face, a midline channel in said front face so as to define a pair of parallel projecting wings and a series of aligned mounting apertures extending through said wings and in communication with and substantially perpendicular to said midline channel.

7. The hitch bar set forth in claim 6, wherein said cast ductile iron has a minimum tensile strength of 65,000 psi a minimum yield strength of 45,000 psi, and an elongation per 2" length of between 6–12%.

8. The hitch bar set forth in claim 6, wherein said cast ductile iron is austempered and further characterized by a 30 Rockwell C hardness and a minimum tensile strength of between 120,000–150,000 psi.

9. The hitch bar set forth in claim 6, wherein said post includes a reinforced section and an anchoring aperture in said reinforced section, said reinforced section having a width corresponding to said margin.

10. The hitch bar set forth in claim 6, wherein said cast ductile iron is selected from a group of the ductile iron grades consisting of SAE D4512 and SAE D5506.

11. A hitch bar for a trailer hitch assembly including a hitch receiver, said hitch bar comprising:

an integral post and mounting rack including means for mounting directly to said hitch receiver cast from ductile iron having rounded graphite in a matrix structure selected from a group consisting of a ferritic matrix, pearlitic matrix and mixtures thereof and said ductile iron having a composition consisting essentially of 2.0–4.5% carbon, 0.75–4.0% silicon, up to 2.0% manganese, up to 0.3% phosphorous, up to 0.3% sulfur, up to 2.0% copper and the balance iron, wherein said post includes upper, lower, left side and right side faces and face cavities recessed within a margin of said left side and right side faces so as to form a substantially I-beam cross section.

\* \* \* \* \*